(12) United States Patent
Ludwig et al.

(10) Patent No.: US 8,200,838 B2
(45) Date of Patent: Jun. 12, 2012

(54) DATA FLOW CONTROL WITH DUPLICATE ACKNOWLEDGEMENT

(75) Inventors: Reiner Ludwig, Huertgenwald (DE); Hannes Ekström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 655 days.

(21) Appl. No.: 11/793,779

(22) PCT Filed: Dec. 22, 2004

(86) PCT No.: PCT/EP2004/014624
§ 371 (c)(1), (2), (4) Date: Jun. 21, 2007

(87) PCT Pub. No.: WO2006/066606
PCT Pub. Date: Jun. 29, 2006

(65) Prior Publication Data
US 2008/0126562 A1    May 29, 2008

(51) Int. Cl.
G06F 15/16 (2006.01)
G01R 31/08 (2006.01)

(52) U.S. Cl. .................. 709/232; 370/231; 709/235

(58) Field of Classification Search ........... 709/230–232
See application file for complete search history.

(56) References Cited

U.S. PATENT DOCUMENTS

| | | | | |
|---|---|---|---|---|
| 5,444,693 A * | 8/1995 | Arslan et al. | ................. | 370/221 |
| 6,757,248 B1 | 6/2004 | Li et al. | | |
| 6,958,997 B1 * | 10/2005 | Bolton | ........................... | 370/392 |
| 2002/0145976 A1 * | 10/2002 | Meyer et al. | ................... | 370/235 |
| 2003/0095537 A1 | 5/2003 | Murakami et al. | | |
| 2004/0215753 A1 * | 10/2004 | Chan et al. | ..................... | 709/223 |
| 2006/0034286 A1 * | 2/2006 | Koning et al. | ................. | 370/394 |

FOREIGN PATENT DOCUMENTS

| | | |
|---|---|---|
| EP | 1 206 062 | 5/2002 |
| EP | 1 206 062 A2 | 5/2002 |
| JP | 2002/229538 | 8/2002 |
| JP | 2002229536 A * | 8/2002 |

(Continued)

OTHER PUBLICATIONS

Lawrence L. Garlick et al; Reliable Host-to-Host Protocols: Problems and Techniques; 1977, ACM,4-65.*

(Continued)

*Primary Examiner* — Ashok Patel
*Assistant Examiner* — Evans Desrosiers
(74) *Attorney, Agent, or Firm* — Nixon & Vanderhye P.C.

(57) ABSTRACT

A method of controlling the flow of an amount of data from a sending peer to a receiving peer of a predetermined communication protocol is described. The method comprises dividing the amount of data into a plurality of data segments, where the data segments are ordered in a sequence. The segments are sent to the receiving peer in the order of said sequence. The receiving peer acknowledges the correct receipt of a data segment and identifies the last correctly received data segment of the sequence that was received in the proper order of the sequence. The sending peer is arranged such that if it receives a threshold number of duplicate acknowledgements, it performs a retransmission. The threshold number that trigger a retransmission is an adaptive parameter determined based on the size of a receive window, the size of the receive window representing a number of data segments which can be stored in a buffer space at the receiving peer.

28 Claims, 6 Drawing Sheets

FOREIGN PATENT DOCUMENTS

RU          2146422          3/2000

OTHER PUBLICATIONS

International Search Report mailed Jul. 25, 2005.
Written Opinion dated Jul. 25, 2005.
M. Allman et al.: "TCP Congestion Control," RFC 2581, pp. 1-13, Apr. 1999.
M. Allman et al.: "Early Restransmit for TCP and SCTP,", Internet Engineering Task Force, Internet Draft, pp. 1-9, Dec. 2003.
S. Bhandarkar et al.: "Improving the Robustness of TCP to Non-Congestion Events," Internet Engineering Task Force, Internet Draft, pp. 1-18, Aug. 2004.
E. Blanton et al.: "On Making TCP More Robust to Packet Reordering," 11 pages, Jan. 4, 2002.
S. Richards: *TCP/IP Illustrated*, vol. 1 ISBN 0-201-63346-9, 1994.
M. Allman et al; TCP Congestion Control, RFC 2581, pp. 2581, pp. 1-13, Apr. 1999.
M. Allman et al; Early Restransmit for TCP and SCTP, Internet Engineering Task Force, Internet Draft, pp. 1-9, Dec. 2003.
Bhandarkar et al; Improving the Rebustness of TCP to Non-Congestion Events; Internet Engineering Task Force, Internet Draft, pp. 1-18, Aug. 2004.
E. Blanton et al; On making TCP more robust to packet re-ordering, 11 pages, Jan. 2002.
Richard Stevens, TCP/IP Illustrated, vol. 1, The Protocols, ISBN 0-201-63346-9, 1994.

* cited by examiner

GENERAL FLOW    HANDLING OF DUPLICATE ACKNOWLEDGEMENTS

DATA FLOW CONTROL WITH DUPLICATE ACKNOWLEDGEMENT

This application is the U.S. national phase of International Application No. PCT/EP2004/014624 filed 22 Dec. 2004 the entire contents of which is hereby incorporated herein by reference.

TECHNICAL FIELD

The technology described herein relates to a method of controlling the flow of an amount of data from a sending peer to a receiving peer of a given communication protocol.

BACKGROUND

In the field of communications, data transmission techniques are known where an amount of data to be transmitted is divided into a plurality of data segments, the data segments being ordered in a sequence. These data segments are then transmitted in the order of said sequence.

This procedure occurs at a so-called sending peer of a communication governed by a predetermined protocol that contains the rules for handling such data segments. The receiving entity associated with the predetermined protocol is referred to as the receiving peer. The concepts of protocols, protocol hierarchies, layering, and protocol peers is well known in the art, see for example "TCP/IP Illustrated Volume 1, The Protocols" by W. Richard Stevens, Addison Wesley 1994. The well known Transmission Control Protocol (TCP) from the TCP/IP protocols suite is an example of such a protocol that arranges data to be sent into a sequence of segments.

Typically, in order to be sent, the individual segments will be placed into data units having a structure defined by the given protocol. These data units may have different names in the context of different protocols, such as packets, frames, protocol data units, cells, etc. In the present description the term "data unit" shall be used generically to cover any such defined data structure. The present specification shall use the terms "segment" and "data unit" interchangeably.

The sending peer will hand the data unit downwards to a lower layer, e.g. a TCP sending peer will hand a TCP segments via the IP layer to a link layer, and on the receiving side the receiving peer shall receive data units from the lower layers. The predetermined structure defining the data units, e.g. defining a beginning and an end, allows the receiving peer to identify individual segments.

It may be noted that in accordance with the OSI layering concept, it does not matter how the data units passed to a lower layer are processed and transported there. Namely, the given sending peer passes a stream of bits downward and the receiving peer receives a stream of bits, where this stream of bits contains certain identifying elements, such as frame boundary indicators, with the help of which the receiving peer can identify individual data units and individual segments.

In order to ensure the reliable transmission of data, many protocols provide the feature of data unit retransmission, which means that segments from the sequence can be retransmitted if necessary. Typically this will be done with the help of an acknowledgement technique, which means that the correct receipt of a data unit by the receiving peer is acknowledged with an appropriate acknowledgement message that the receiving peer sends back to the sending peer. Once the sending peer has received such an acknowledgment message, it can appropriately continue sending further data units, or if no acknowledgement or a non-acknowledgement message is received, the data unit that was not correctly received by the receiving peer can be retransmitted by the sending peer.

Several mechanisms are known with the help of which a sending peer is supposed to obtain an indication that the loss of a data unit or segment has occurred, such that an appropriate retransmission can take place. One such known feature is retransmission time-out, which means that after sending a data unit, a timer is monitored, and if a predetermined amount of time passes without having received an acknowledgement for the given data unit, then it is assumed that the data unit has been lost and it is accordingly retransmitted.

Another such mechanism is that of counting duplicate acknowledgements. A duplicate acknowledgement is an acknowledgement that identifies as the last correctly received data segment a data segment that has already been acknowledged previously. Namely, many protocols, such as e.g. TCP, have an acknowledgement generating mechanism for receiving peers that operates to send out an acknowledgement message for each correctly received segment of the sequence, where the acknowledgement identifies the last correctly received data segment in the order of sequence. In other words, if for example the first to fourth data segments have been received and acknowledged, and then the fifth data segment arrives, the receiving peer will send out an acknowledgement for that fifth segment. If thereafter the seventh and eight segments correctly arrive, then the receiving peer will again send out one or two acknowledgement messages, but these acknowledgement messages will only identify the fifth segment, because the fifth was the last segment that was correctly received in the order of the sequence. Namely, the receiving peer is expecting the sixth segment, and even if it correctly receives segments above the sixth segment, it will continue to acknowledge the fifth segment. Consequently, the receipt of duplicate acknowledgements by the sending peer gives the sending peer an indication that a data unit has been lost.

As a consequence, in protocols that use the above described acknowledgement mechanism according to which acknowledgement messages only acknowledge the last data unit that was correctly received in the order of the sequence, even if data units are received that lie further on in said sequence, a retransmission mechanism may be implemented that performs a retransmission if a predetermined number of duplicate acknowledgements is received by the sending peer. In TCP, the corresponding mechanism is known as "fast retransmit", where a retransmission is enacted after the receipt of three duplicate acknowledgements. A detailed description of the fast retransmit mechanism in TCP can e.g. be found in the above mentioned book by Stevens, chapter 21.7.

All such mechanisms as described above for receiving an indication that a data unit has been lost, suffer from the problem that the sending peer only receives an indirect indication that a data unit was lost, and in fact the occurrence of the predetermined triggering event (a time-out or a predetermined number of duplicate acknowledgements) does not necessarily mean that a data unit was really lost. These triggering events can also be caused spuriously, e.g. if a data unit is delayed in the transmission network, while data units associated with segments further on in the sequence are delivered by the network. Such a phenomenon is also referred to as reordering.

SUMMARY

It is the object of the technology described herein to generally improve the possibilities for handling the retransmission of segments in a sending peer.

This object is solved by a method of controlling the flow of a sequence of data segments from a sending peer to a receiving peer, comprising transmitting data segments from the sending peer to the receiving peer in the order of the sequence; receiving acknowledgement messages from the receiving peer, wherein an acknowledgement message indicates the correct receipt of a data segment in the proper order of the sequence; receiving a duplicate acknowledgement message from the receiving peer at the sending peer, if a data segment was received but not in the proper order of the sequence, the duplicate acknowledgement message being received in association with the last correctly received packet in the order of the sequence of data segments; deciding that a data segment was lost, which was sent but not acknowledged, if the number of duplicate acknowledgement messages received by the sending peer reaches a duplicate acknowledgement message threshold determined based on the size of a receive window, the size of the receive window corresponding to a number of data segments which can be stored in a buffer space at the receiving peer; and retransmitting the data segment determined to be lost.

Accordingly, the sending peer can set the duplicate acknowledgement message threshold by considering the situation at the receiving peer.

According to another embodiment (all embodiments are examples and non-limiting), the duplicate acknowledgement threshold is set such that the data segment determined to be lost is retransmitted before a point in time in the sequence of data segments selected such that the acknowledgement message indicating proper receipt of the data segment determined to be lost, i.e. the retransmitted data segment, is expected to be received at the sending peer before transmitting the data segment with a sequence number exceeding the sequence number of the data segment determined to be lost by the size of the receive window. Accordingly, the threshold can always be maintained on a value with optimum utilization of the resources at the receiving peer.

According to another embodiment, the duplicate acknowledgement message threshold is determined on the basis of a size of a usable window constituted by the difference between the size of the receive window and a flight size, the flight size representing the number of transmitted data segments which have not yet been acknowledged.

Still further, the duplicate acknowledgement message threshold may be determined based on the difference between the size of the usable window and the flight size.

According to another embodiment, the duplicate acknowledgement message threshold is determined one instant in time prior to receiving the first duplication message as the larger value of the value 1 and the value obtained by calculating (size of receive window−(k×flight size)), wherein k is a float. Advantageously, k=2.

Still further, the duplicate acknowledgement message threshold may be determined as size of the receive window−(2×flight size)+N, with N constituting a tuning parameter satisfying the condition (2×flight size)−size of receive window+1<N<3.

According to another embodiment, the duplicate acknowledgement message threshold is updated upon determining a change in the size of the receive window.

Alternatively, the duplicate acknowledgement threshold may be updated at least each first time a duplicate acknowledgement message for one of the data segments is received. In this case the tuning parameter N may preferably be set to 5.

In another alternative, the duplicate acknowledgement message threshold is updated each time an acknowledgement message is received.

According to another embodiment, the data segment determined to be lost is retransmitted, if the sending peer is blocked from transmitting a previously unsent data segment.

In this embodiment, the sending peer is considered blocked, if one of the following conditions is fulfilled: the number of previously unsent data segments exceeds the size of the receive window; the number of previously unsent data segments exceeds the size of the send window; or an application constituting the source of the data segments does not supply data segments for transmission.

A computer program may be arranged to perform at least one of the above operations when executed on a computer.

A computer readable memory device may store the computer program.

Still further, the object is solved by a communication device controlling the flow of a sequence of data segments from a sending peer to a receiving peer, comprising means for transmitting data segments from the sending peer to the receiving peer in the order of the sequence, means for receiving acknowledgment messages from the receiving peer, where an acknowledgment message indicates the correct receipt of a data segment in the proper order of the sequence, means for receiving a duplicate acknowledgement message from the receiving peer at the sending peer, if a data segment was received but not in the proper order of the sequence, the duplicate acknowledgement message being received in association with the last correctly received packet in the order of the sequence of data segments, means for deciding that a data segment was lost, which was sent but not acknowledged, if the number of duplicate acknowledgement messages reaches a duplicate acknowledgement threshold determined based on the size of a receive window, the size of the receive window corresponding to a number of data segments which can be stored in a buffer space at the receiving peer; and means for retransmitting the data segment determined to be lost.

DETAILED DESCRIPTION OF EXAMPLE NON-LIMITING EMBODIMENTS

The technology described herein is applicable to any implementation of a given communication protocol to which an amount of data that is to be sent is divided into a plurality of data segments, and said data segments are ordered in a sequence, where the data segments are sent from the sending peer to the receiving peer in the order of said sequence, where a receiving peer sends acknowledgements to the sending peer, said acknowledgements indicating the correct receipt in the proper order of the sequence, such that an acknowledgement message indicates the last correctly received data segment of said sequence that was received in the proper order of the sequence, and where if the sending peer receives a threshold number of acknowledgement messages that each identify the same data segment as the last correctly received data segment of the segment that was received in the proper order, the segment that immediately follows the segment for which duplicate acknowledgements were received is retransmitted.

An example of such a protocol is TCP. However, it is explicitly noted that the technology described herein is also applicable to any other communication protocol that has the above described characteristics as far as they are relevant for implementing the technology described herein.

According to the technology described herein, the threshold number of acknowledgement messages, i.e. the duplicate acknowledgement threshold is a parameter determined based on the size of a receive window, the size of the receive window representing a number of data segments which can be stored in a buffer space at the receiving peer.

As already mentioned previously, therefore, the duplicate acknowledgement threshold is a parameter that is associated with the sending peer's decision on how long to wait until a given segment for which duplicate acknowledgements are being received is assumed to have been lost. Due to the technology described herein, according to which the threshold is adapted, it is possible to make this decision itself adaptive and thereby more flexible.

Figure 1:
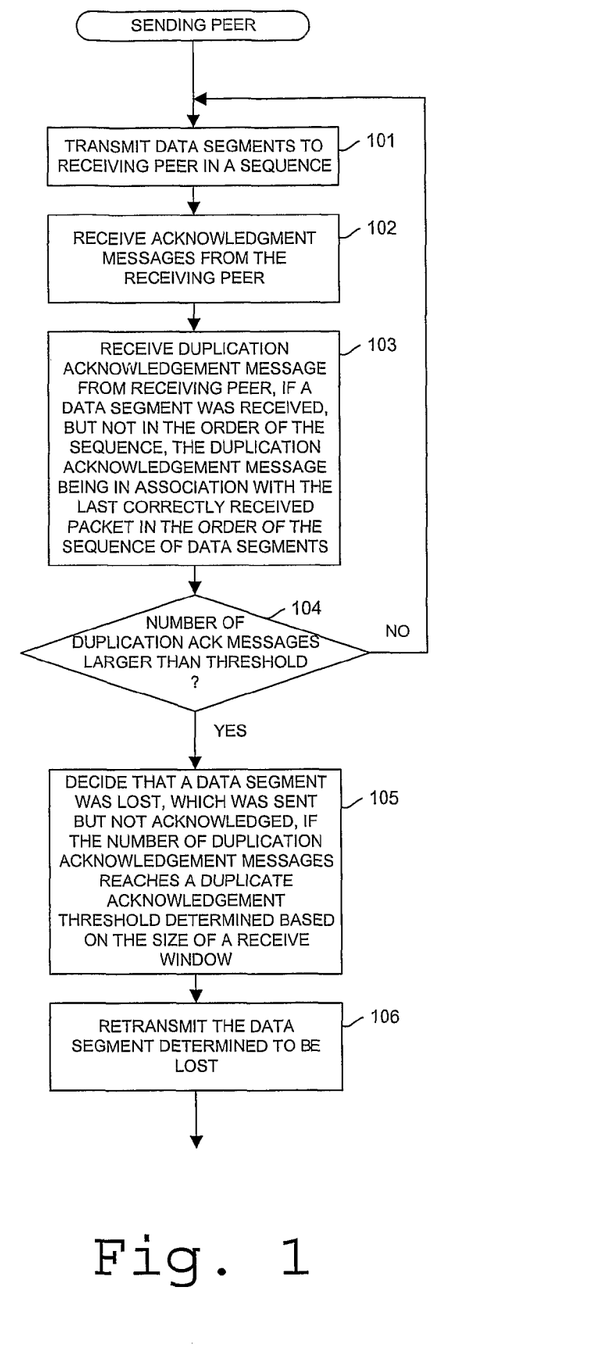
FIG. 1 illustrates operations of a method for controlling the flow of a data sequence according to an embodiment.

FIG. 1 illustrates operations for controlling a flow of data segments between a sending peer and a receiving peer (not shown) according to an embodiment.

In a first operation 101 the sending peer is considered to carry out a normal routine of transmitting data segments to a receiving peer in a certain given sequence. For example, the data segments are numbered consecutively such as 01, 02, 03, 04, 05, 06, . . . and scheduled for transmission at the sending peer in the order of the sequential numbering. The sequential numbering may suitably correspond to the output of data segments of a data source, e.g. as known in the art. It is understood that the data segments may carry any kind of payload data, i.e. data relating to any kind of application or format, such as voice data, data exchange between computing device in a communication session, video data, audio data and similar.

The receiving peer (not shown in FIG. 1) receives the data segments and acknowledges the receipt of the data segments with an acknowledgement message returned to the sending peer. These acknowledgement messages from the receiving peer are received at the sending peer in an operation 102. If operation is normal and data segments transmitted in a sequence are received in the same sequence at the receiving peer, each data packet is acknowledged with an acknowledgement message and the sending peer knows that the data segments are received in the proper order of the sequence. The data segments which have been transmitted from the sending peer and properly acknowledged, can be discarded, e.g. removed from a transmit buffer at the sending peer, as it a retransmission of the transmitted data segments will not be required.

Generally, each correctly received data segment, i.e. error free and in the order of the sequence, triggers an acknowledgement message at the receiving peer, which is returned to the sending peer. If after a correctly received data segment a data segment is received which is not in the order of the sequence, i.e. a delay or fault in transmitting a data segment occurred, then the acknowledgement message for the last correctly received data segment is repeated, and this repeated acknowledgement message is termed duplicate acknowledgement message.

In the above example, if for one reason or the other a data segment is not received in the proper order of the transmitting sequence, e.g. if data segment 05 is received after segments 01, 02, 03 but before data segment 04, the receiving peer thus does not return an acknowledgement message to the sending peer. Instead, the receiving peer transmits a duplicate acknowledgement message to the sending peer, indicating that a data segment was received, but not in the order of the sequence. The duplicate acknowledgement message is associated with the last correctly received packet in the order of the sequence of data segments. The duplicate acknowledgement message in the above example of receiving data segment 05 before data segment 04 will indicate that the last data segment which was correctly received in the order of the sequence was data segment 03.

The duplicate acknowledgement message received at the sending peer in an operation 103 consequently notifies the sending peer that a retransmission of the packet following the last correctly received packet may be required, in case it turns out or is determined that this data packet was actually lost during the transmission path from the sending peer to the receiving peer. Hence, the sending peer may not discard all those data packets from the sending buffer, which were transmitted after the last correctly received data packet indicated by the duplicate acknowledgement message received in operation 103.

However, the sending peer continues to transmit data segments to the receiving peer, and thus, presuming that the data segment 04 of the above example is still not received at the receiving peer for a longer period of time, the receiving peer continues to transmit duplicate acknowledgement messages for each received data segment. Accordingly, the sending peer receives an increasing number of duplicate acknowledgement messages, and with each duplicate acknowledgement message, the probability that the unacknowledged data segment was actually lost, increases.

In an operation 104 the sending peer now decides whether the number of duplicate acknowledgement messages reaches or exceeds an appropriately set (as will be described later) duplicate acknowledgement message threshold set at the sending peer. If in operation 104 the decision is "NO", indicating that the duplicate acknowledgement message threshold is not yet been reached, the flow of operation returns to operation 101, i.e., the sending peer continues to transmit data segments in the order of the sequence.

However, if in operation 104 the decision is "YES", indicating that the duplicate acknowledgement message threshold is reached or exceeded, in an operation 105 the sending peer decides that the data segment was lost, which was sent but not acknowledged. Continuing with the above example, with the duplicate acknowledgement messages indicating that the last correctly received data segment in the order of the sequence was data segment 3, the sending peer will decide that the data segment 4 was actually lost.

In an operation 106 the data segment determined to be lost, i.e. in the example data segment 04, is retransmitted. The retransmission may for example be carried out by a fast retransmit according to the TCP protocol.

Of course, it is of important to suitably set the duplicate acknowledgement message threshold keeping in mind that too-early retransmission of data packets causes unnecessary traffic, and that refraining-from-retransmitting a data segment for too long may cause a blocking of further transmissions, as all data segments which have been transmitted but not acknowledged must be kept in the buffers of the sending peer and receiving peer.

For superior flow control, the duplicate acknowledgement message threshold can be set under consideration of the size of a receive window at the receiving peer, the size of the receive window constituting the number of data segments which can be stored in a buffer space at the receiving peer. This size of the receive window may be reported by the receiving peer for example with the acknowledgement messages, such that the sending peer is always aware of the present size of the receive window.

More precisely, the threshold should be set such that a transmission of data segments at no point in time is prohibited due to reaching at the sending peer the maximum allowed transmitted but not acknowledged data segments, this maximum number being equal to the size of the receive window. Note that according to a sliding window protocol a data segment from the sending peer according to a communication protocol may only be scheduled for transmission, if the difference in sequence numbers of the oldest acknowledged data segment and the next data segment for transmission does not exceed the size of the receive window.

The above illustrated an embodiment where the calculation of the duplicate acknowledgement threshold uses the size of the receive window. It is noted that, even though not further described here, the duplicate acknowledgement threshold may in addition thereto be further adapted based on the situation at the sending peer, e.g. a size of a window at the sending peer to further improve the setting of the duplicate acknowledgement threshold.

Figure 2:
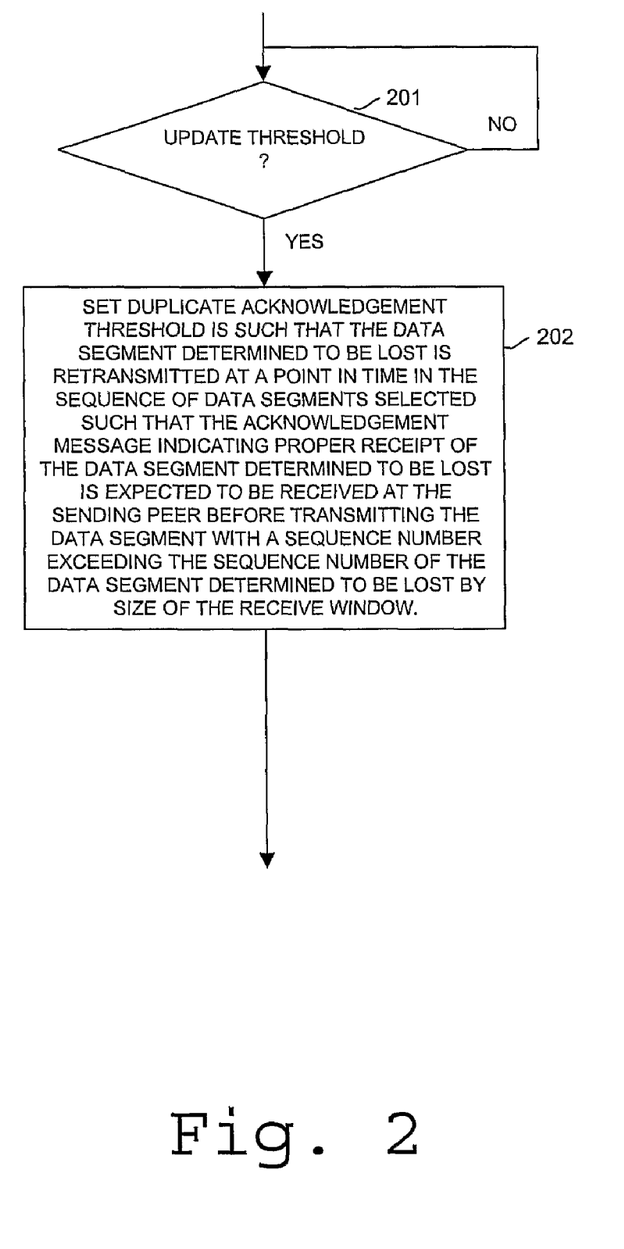
FIG. 2 illustrates operations for determining the duplicate acknowledgement threshold according to an embodiment.

In the following a further embodiment will be described with regard to FIG. 2. FIG. 2 illustrates operations for suitably setting the duplicate acknowledgement message threshold.

As noted above, the threshold is suitably to be selected such that a buffer overflow at the receiving peer can surely be avoided and that further a stalling of a transmission of data segments from the sending peer can surely be avoided. A stalling or blocking of a transmission at the sending peer can occur if the number of sent but unacknowledged data segments is about to exceed the sized of the receive window.

To meet these conditions, it must always be assured that the number of data segments which have been transmitted after and including the oldest unacknowledged data segment does not exceed the size of the receive window at the receiving peer.

Accordingly, if a data segment has not been acknowledged, a retransmission of this data segment is to be scheduled at a point in time that still allows an acknowledgement of proper receipt of the retransmission of this data segment to reach the sending peer before a data segment with a sequence number is scheduled for transmission which would potentially lead to an overflow of the receiver buffer if no proper acknowledgement of the retransmitted data segment were received.

In other words, the retransmission of the unacknowledged data segment needs to be performed such that an acknowledgement pertaining to this retransmission is expected to be received at the sending peer before the transmitted number of data segments since and including the unacknowledged data segment exceeds the size of the receive window. If this condition were not met, the sending peer would not be allowed to transmit further data packets, and the connection would stall.

In FIG. 2, in an operation 201, it is decided whether the duplicate acknowledgement message threshold should be updated according to conditions to be described later. If the decision is "YES", in operation 202, in accordance with the above said, the duplicate acknowledgement message threshold is set such that the data segment determined to be lost is retransmitted at or before a point in time in the sequence of data segments selected such that the acknowledgement message indicating proper receipt of the data segment determined to be lost is expected to be received at the sending peer before the data segment with a sequence number exceeding the sequence number of the data segment determined to be lost by the size of the receive window is scheduled for transmission. Accordingly, it can be avoided that the sending peer is barred from transmitting further data segments.

In this case a window stalling in the data transmission can be avoided and further, an overflow of the receive buffer can be avoided.

Figure 3:
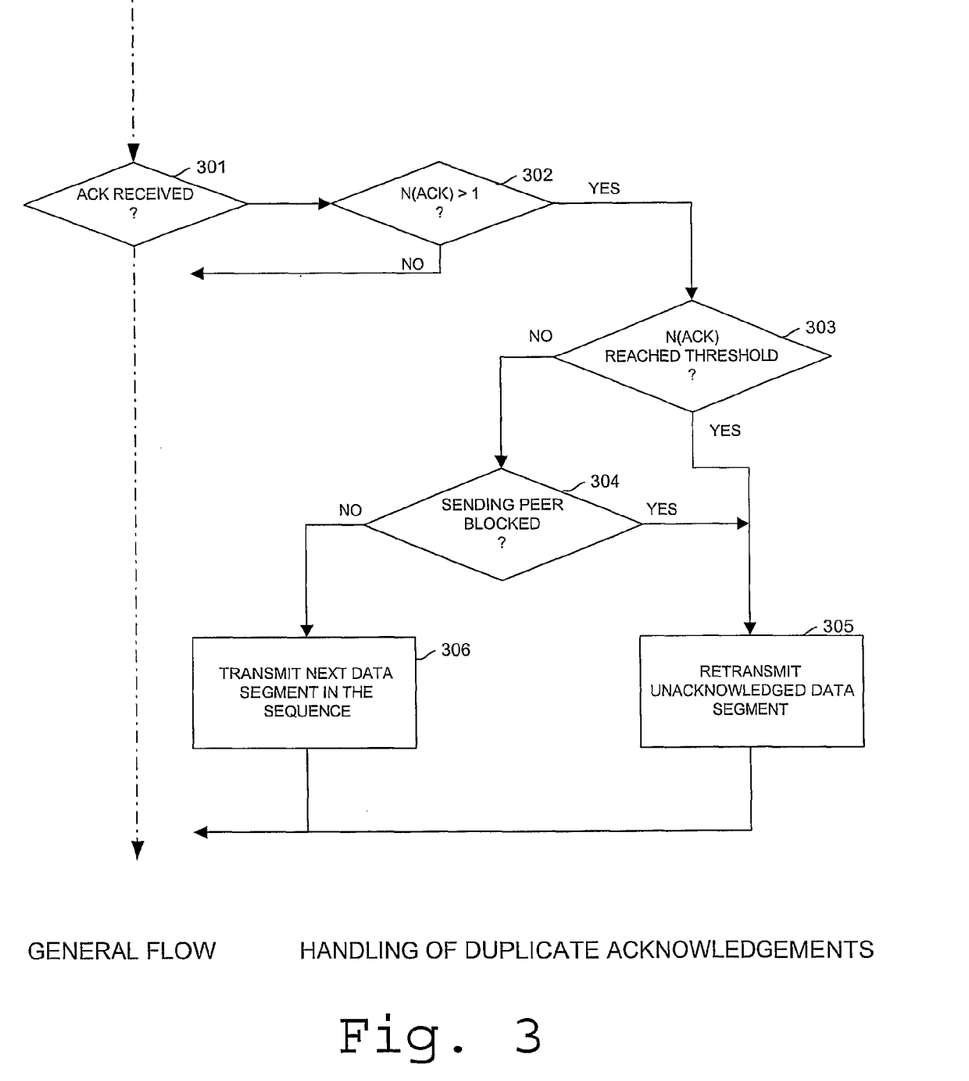
FIG. 3 illustrates operations for controlling the flow of data segments from a sending peer to a receiving peer according to another embodiment, particularly outlining a flow for retransmitting an unacknowledged data segment.

FIG. 3 shows a flow chart that describes an embodiment. The left hand side of the flow chart relates to general flow control, and due to the fact that the technology described herein is not concerned with the general type of flow control, e.g. as provided by TCP or any other flow control protocol, this part is only shown schematically as a dashed line. The right hand side of the Fig. discloses a procedure for handling duplicate acknowledgements. Namely, if in the course of the general flow control an acknowledgement (ACK) is received, see operation 301 then the procedure for handling duplicate acknowledgements is triggered.

In operation 302 it is determined if the acknowledgement is a duplicate acknowledgement. Namely, the number of times N that the specific acknowledgement, which identifies the last correctly received data segment of the sequence that was received in the proper order of the sequence, is determined and it is judged if this number N is larger than 1. If not, then the ACK is not a duplicate ACK, and the procedure returns to the general flow control.

If the outcome of operation 302 indicates that the acknowledgement is a duplicate acknowledgement, the procedure goes to operation 303, where it is determined if N(ACK) reached the duplicate acknowledgement threshold Th. Depending on the implementation, the duplicate acknowledgement threshold may be considered to be reached if N(ACK) is equal to the duplicate acknowledgement threshold. Alternatively, the duplicate acknowledgement threshold may be considered to be reached if N(ACK) is larger than the duplicate acknowledgement threshold.

This operation can be implemented in any appropriate way, for example by simply keeping a record of the last acknowledged segment and setting an associated counter, such that if a newly received acknowledgment is identical to the previous acknowledgement (i.e. a duplicate acknowledgement) the counter is incremented by one, and if the new acknowledgement identifies a segment that is subsequent to the segment identified in the last received acknowledgement, then the counter is reset to 1.

In the example of FIG. 3, N(ACK) indicates the number of times that the sending peer has received the given acknowledgement ACK. In other words, N=1 means that the acknowledgement for a given segment has been received the first time, and a number N>1 indicates that it is a duplicate acknowledgement.

If operation 303 determines that the number of acknowledgments has reached the threshold, then the oldest unacknowledged segment is retransmitted in operation 305. The oldest unacknowledged segment then immediately follows the segment identified in the duplicate acknowledgments. On the other hand, if the outcome of operation 303 is negative, the flow proceeds to operation 304 to also consider the situation at the sending peer.

In operation 304 it is determined whether the sending peer is blocked from transmitting data segments due to a condition arising at the sending peer. Blocked in this connection means that the sending peer is not allowed or otherwise unable to transmit data segments to the receiving peer.

According to an example, the sending peer is considered blocked, if the number of previously unsent data segments exceeds the size of the receive window. For example due to an error or an unforeseen condition the duplicate acknowledgement threshold may be selected to large and the receive window size may be reached. This situation may be termed receiver limited.

According to another example, the sending peer is considered blocked, if the number of previously unsent data segments exceeds the size of the send window. For example the transmit buffer of the sending peer may be a shared memory area with a space left for storing data segments reduced in size, such as below the size of the receive window. This situation may be termed sender limited.

According to another example, the sending peer is considered blocked, if an application constituting the source of the data segments does not supply data segments for transmission. For example, data segments may be generated dynamically, e.g. of a web page, and the application may temporarily cease generating new data segments. Further, an application may simply presently have no further data segments for transmission. This situation may be termed application limited.

If in operation 304 it is determined that the sending peer is blocked from transmitting data segments, then the oldest unacknowledged segment is retransmitted in operation 305.

If in operation 304 it is determined that the sending peer is not blocked from transmitting data segments, then the next segment in the sequence following the segment that immediately follows the segment identified in the duplicate acknowledgment is transmitted in an operation 306.

After operations 305 or 306, the procedure returns to the general flow control.

It is noted that operation 304 may be optional and that in an alternative the flow may return, if the decision in operation 303 is "NO", to the general flow instead or proceed to operation 306 for transmitting the next data segment in the sequence.

It may be noted that the embodiment of FIG. 3 is only one example, and this example can be varied in a number of ways. The skilled person will understand that the operations can also be arranged differently. Moreover, operation 306 is only an example, as the technology described herein is not specifically concerned with the procedure after the duplicate acknowledgment threshold is exceeded. In other words, the procedure after exceeding the duplicate acknowledgment threshold can be chosen in any appropriate or suitable way, where different possibilities for TCP-like protocols shall be discussed further on.

Equally, the response in the general flow control to duplicate acknowledgments is not essential. For example, after the negative outcome of operation 303, which means that a duplicate acknowledgment has been received, but the number of duplicate acknowledgments has not yet reached the threshold, the general flow control can stop sending any further segments, or can equally well continue to send further segments.

The duplicate acknowledgment threshold can be set or updated in any suitable or desirable way. For example, it can be updated at regular intervals, based on one or more values used for adapting the threshold. In other words, these one or more values are regularly measured or determined, and the threshold Th is accordingly updated. This process occurs outside of what is shown in FIG. 3, in an independent procedure. Consequently, this independent procedure regularly updates the value of Th that is appropriately stored, and operations 303 and 304 simply access or call the current value of Th. On the other hand, it is also possible to update Th at the occurrence of a predetermined triggering event. One possibility can consist in updating Th only if one or more of the one or more values used to adapt Th have changed. Such a procedure would again be independent of what is shown in FIG. 3, and operations 303 and 304 would simply access or call the current value of Th.

Figure 4:
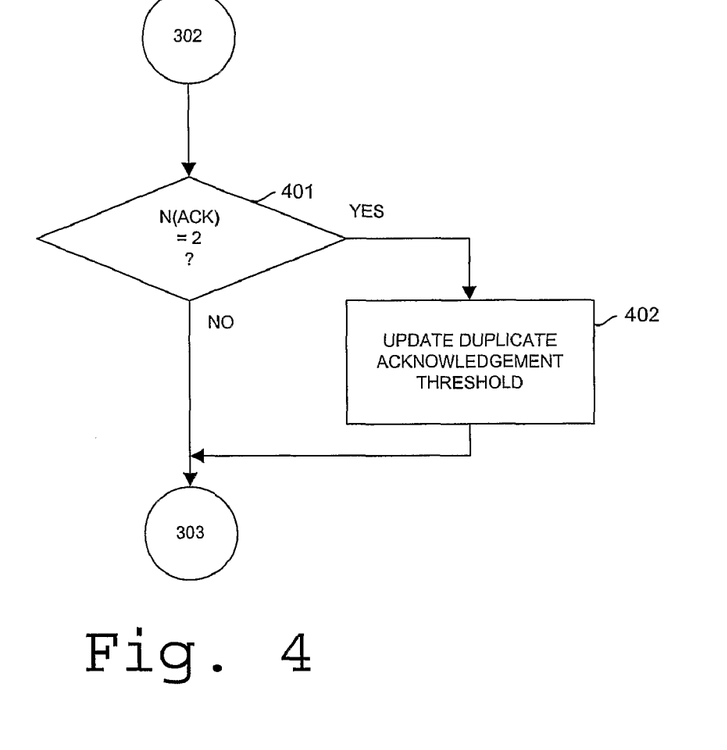
FIG. 4 illustrates operations for updating the duplicate acknowledgement threshold according to an embodiment.

However, the specified triggering event can also be a part of the procedure shown in FIG. 4. Namely, it is possible to perform an updating of Th at the occurrence of a triggering event that is associated with the receipt of acknowledgments. For example, Th can be updated at every first receipt of a duplicate ACK. This is shown in FIG. 4, where the same reference numerals as used in FIG. 3 refer to the same operations. In other words, the operations 401 and 402 shown in FIG. 4 are implemented between the operations 302 and 303 as shown in FIG. 3. After operation 302 has determined that a duplicate acknowledgment has been received, operation 401 determines if the duplicate acknowledgment is the first duplicate acknowledgment, namely if N(ACK)=2, and if this is the case, then Th is updated in operation 402. After operations 401 or 402, operation 303 is performed, and all the other operations already discussed in connection with FIG. 3, such that a further discussion is not necessary.

Figure 5:
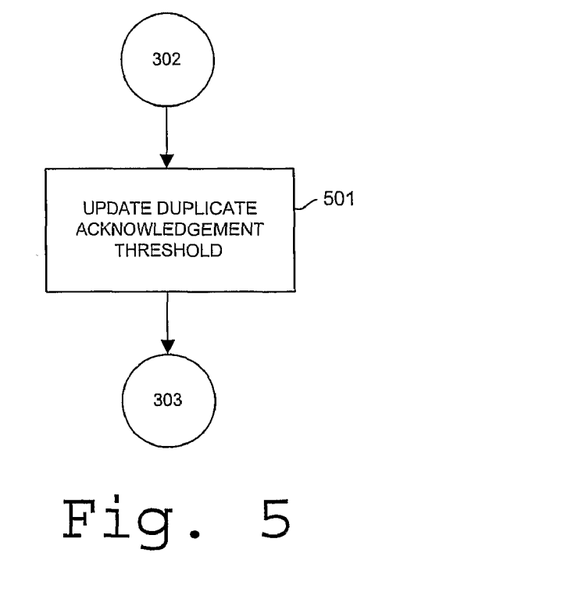
FIG. 5 illustrates operations for updating the duplicate acknowledgement threshold according to an embodiment.

It is also possible to perform an updating of Th at every duplicate acknowledgment. This is shown in FIG. 5. Namely, the updating operation 501 follows after operation 302, such that every duplicate acknowledgment leads to an updating of Th.

As another alternative, which is not shown in the figures, the threshold Th can also be updated at every acknowledgment. In other words, the updating operation would be implemented between operations 301 and 302 of FIG. 3. Another variation can consist in updating the threshold Th at every ACK that relates to outstanding data segments, i.e. only for such acknowledgments where N(ACK)=1. Consequently, the updating operation could be implemented at the negative output of operation 302 in FIG. 3.

As described above, the updating of the duplicate acknowledgment threshold Th can be done whenever suitable or desirable. Equally, it can be done on any appropriate or suitable basis by taking into account the size of the receiving window at the receiving peer, as noted above.

Figure 6:
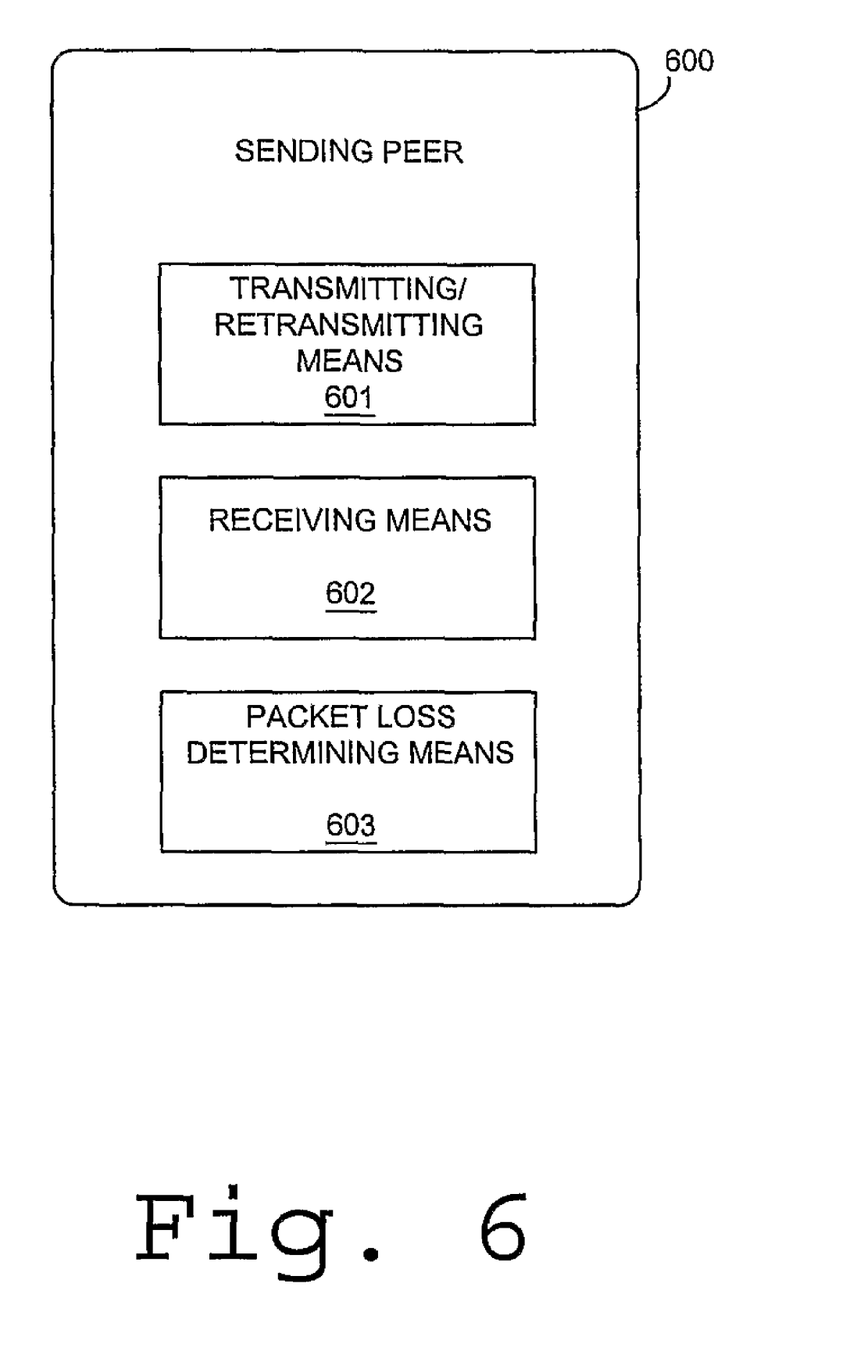
FIG. 6 illustrates a communication device for controlling the flow of data segments, the communication device at least acting as a sending peer.

In the following a further embodiment of the technology described herein will be described with regard to FIG. 6. FIG. 6 illustrates elements of a sending peer for controlling a flow of data segments transmitted between a sending peer and receiving peer, for example utilizing the TCP protocol or any other suitable communication protocol.

FIG. 6 illustrates a sending peer 600, such as any kind of computing device, e.g. a desktop computer, laptop computer, mobile computing device such as PDA or mobile telephone and similar. The technology described herein is equally applicable to wire-bound data exchange as well as wireless or at least partially wireless data transmission.

The sending peer comprises transmitting/retransmitting means 601 for transmitting data segments from the sending peer to the receiving peer in the order of the sequence and for retransmitting a data segment determined to be lost, as noted with regard to previous embodiments.

Further, the sending peer comprises receiving means 602, for receiving acknowledgement messages from the receiving peer, were an acknowledgement message in case the correct receipt of a data segment in the proper order of the sequence, and for receiving a duplicate acknowledgement message from the receiving peer if a data segment was received, but not in the proper order of the sequence, the duplicate acknowledgement message being received in association with the last correctly received data segment in order of the sequence of data segments.

Further, the sending peer comprises packet loss determining means 603 for deciding that a data segment was lost which was sent but not acknowledged, if the number of duplicate acknowledgement messages reaches a duplicate acknowledgement message threshold determined based on the size of a receive window, the size of the receive window corresponding to a number of data segments which can be stored in a buffer space at the receiving peer. The packet loss determining means may obtain information on the size of the receive window with acknowledgement messages received from the receiving peer, or by any other means.

Further, the packet loss determining means may be adapted to set the duplicate acknowledgement threshold such that the data segment determined to be lost is retransmitted at a point in time in the sequence of data segments selected such that the acknowledgement message indicating proper receipt of the data segment determined to be lost, i.e. the retransmitted data segment, is expected to be received at the sending peer before transmitting the data segment with a sequence number exceeding the sequence number of the data segment determined to be lost by the size of the receive window.

In the following a further embodiment will be described with regard to FIG. 6.

Figure 7:
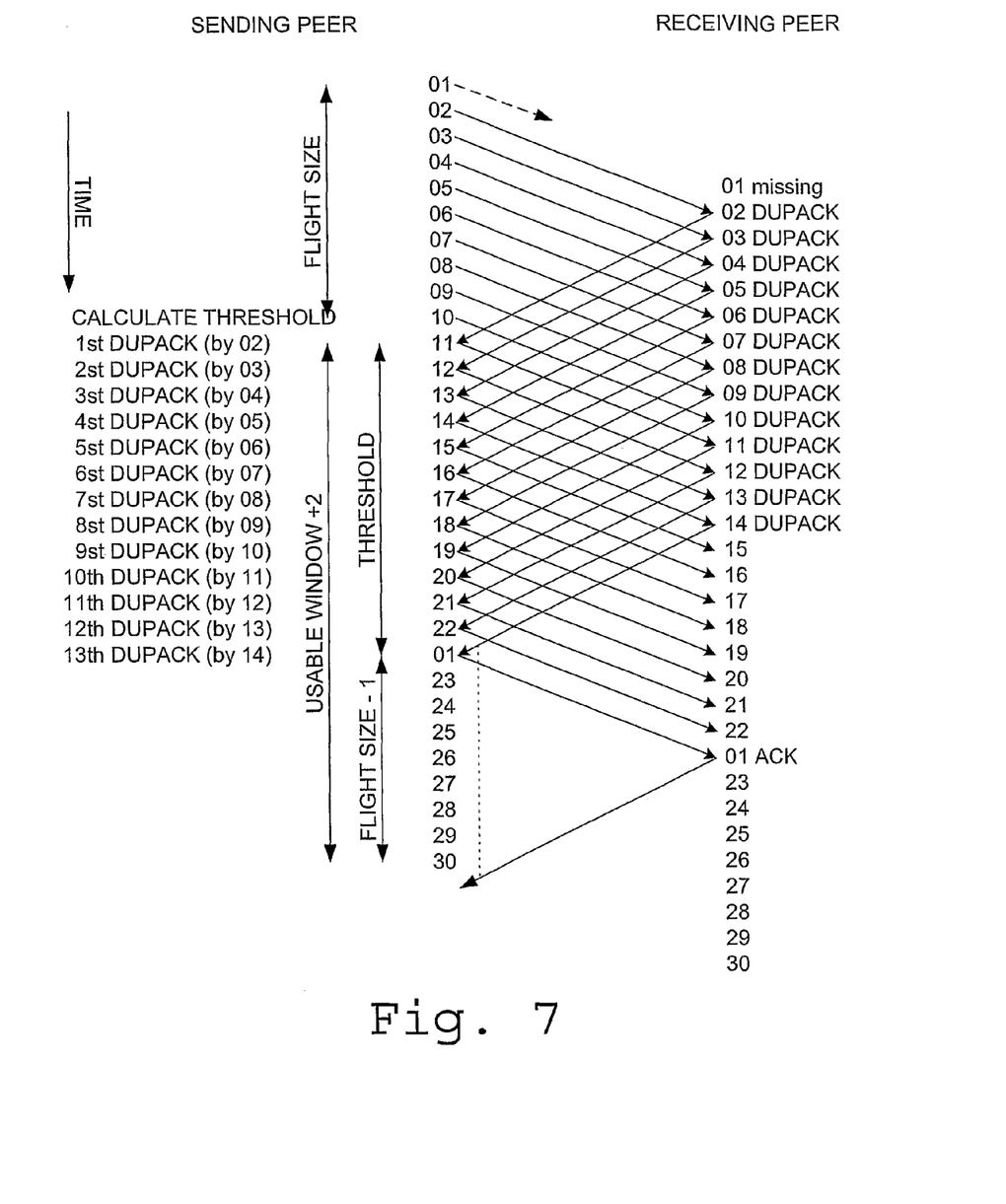
FIG. 7 shows a detailed illustration of a flow of data segments and acknowledgement messages between a sending peer and a receiving peer to illustrate determination of the duplicate acknowledgement threshold.

FIG. 7 illustrates a detailed embodiment for further illustrating the principles of determining the duplicate acknowledgement message threshold by use an example of the TCP protocol.

FIG. 7 illustrates a sending peer and a receiving peer, as for example noted with regard to previous embodiments.

At the sending peer a sequence of data segments labelled 01, 02, 03 . . . 30 for transmission to the receiving peer is illustrated, including a retransmission of data segment 01 which is considered lost or excessively delayed on the transmission path. Data segment 01 is retransmitted after data segment 22, for reasons explained in the following.

In the embodiment of FIG. 7 the duplicate acknowledgement threshold is set based on the size of the receive window and more precisely, is set such that the data segment determined to be lost is retransmitted at a point in time in the sequence of data segments selected such that the acknowledgement message indicating proper receipt of the data segment determined to be lost is expected to be received at the sending peer before transmitting the data segment with the sequence number exceeding the sequence number of the data segment determined to be lost by the size of the receive window. The point in time for retransmitting the data segment 01 constitutes the latest point in time possible before stalling at the sending peer would occur. Therefore, while further delayed transmission, i.e. a further increased duplicate acknowledgement threshold should be avoided, a lesser delay, i.e. a reduced duplicate acknowledgement threshold would generally be possible.

In the present case the size of the receive window is considered to be 30, i.e., the receive buffer has 30 storage locations for data segments. This implies for the transmission of data segments, that a 31st data segment can only be transmitted after an acknowledgement for the first data segment is received.

In the example of FIG. 7, as noted before, and as indicated by the dashed arrow, data segment 01 transmitted at the sending peer as a first data segment, is considered to be lost along the transmission path. Data segments 02, 03 etc., are considered to be transmitted and received properly.

Accordingly, as data segment 01 is missing at the receiving peer, the receipt of the data segment 02 at the receiving peer will trigger a return of a first duplicate acknowledgement message (DUPACK) which is considered to be received at the sending peer after transmission of data packet 10 and before transmission of data packet 11. This delay of the DUPACK is associated with the transmission delays, processing delays and similar. Similarly, as data segment 01 continuous to be missing, all subsequent receptions of data segments at the receiving peer will trigger the transmission of duplicate acknowledgement messages from the receiving peer to the sending peer, the sending peer receiving an increasing number of duplicate acknowledgement messages as indicated on the left hand side of FIG. 7. If the sending peer would continue to transmit data segments in the order of the sequence, without retransmitting the first data segment 01, eventually the data segment 30 will be transmitted and transmission would have to be halted, as the size of the receive window would be reached. In other words, further transmissions after the data segment 30 would be not allowed, as acknowledgements for 30 data segments are outstanding, 30 data segments from and including the data segment 01. A stalling or blocking of a transmission at the sending peer can for example occur if the number of sent but unacknowledged data segments is about to exceed the sized of the receive window.

In order to avoid this situation, as shown in the figure, the first data packet 01 is retransmitted after receiving the 13$^{th}$ duplicate acknowledgement message triggered by the 14$^{th}$ transmitted data packet, data packet 14, in order to allow enough time for the acknowledgement of the retransmitted data segment 01 to reach the sending peer before data segment 31 is to be transmitted. Accordingly, data segment 01 should exactly or at the latest be transmitted after receiving the 13$^{th}$ duplicate acknowledgement message, after data segment 22, allowing to avoid a stalling of the transmission of the sequence of data segments beyond the data segment 30.

Retransmitting the data segment 01 after the 13$^{th}$ duplicate acknowledgement message in this example must therefore be avoided unless a stalling of the transmission is accepted or by other means avoided. Earlier transmission does not lead to any stalling, but increases the network traffic caused by possibly unnecessary retransmissions. In other words, it should be waited as long as possible with retransmitting data segment 01 such that a stalling at the sending peer of the transmission can be avoided, as depicted in FIG. 7.

Advantageously, the duplicate acknowledgement message threshold therefore is determined on the basis of a size of a usable window constituted by the difference between the size of the receive window and a flight size, the flight size representing the number of transmitted data segments which have not yet been acknowledged. If it is for example assumed that the duplicate acknowledgement message threshold is calculated when transmitting the data segment 10, the flight size, i.e., the transmitted but not yet acknowledged data segments, is 10. Further, the usable window as indicated in the figure is defined as the size of the receive window minus the size of the send window, i.e., the difference between the left edge of the send window being the lowest sequence number of data segments that has been sent but not acknowledged and the right edge of the send window being the lowest sequence number of data segments not yet being sent. The usable window, in other words, is the amount of data that a TCP sender could send at any given point in time, if permitted by conditions, until becoming limited by the receiving peer.

Still further, it is preferred to set the duplicate acknowledgement threshold based on the difference between the size of the usable window and the flight size. More precisely, according to another example, if it is again assumed that the duplicate acknowledgement threshold is calculated just prior to receiving the first duplicate acknowledgement message, i.e., when transmitting the data segment 10, the duplicate acknowledgement message threshold meeting the condition shown in FIG. 7 and explained above, is the size of usable window+2−(flight size−1)

which is equal size of usable window−the flight size+3.

If in another alternative it were assumed that the duplicate acknowledgement threshold is calculated on receiving the first duplicate acknowledgement message, i.e., upon transmitting the data segment 11, please be referred to the previous embodiments for updating the threshold, the usable window would be reduced by 1, the flight size would be increased by 1 and thus the duplicate acknowledgement threshold would be calculated as usable window−flight size+5.

In more general terms the duplicate acknowledgement threshold can be calculated as the size of usable window−the flight size+N and with the above explained condition that the usable window=receive window−flight size the duplicate acknowledgement threshold is obtained as size of receive window−2×flight size or still more general, size of receive window−(k×flight size))

wherein k is a floating value.

Still further, according to another example, the duplicate acknowledgement threshold is determined as size of receive window−(2×flight size)+N, with N constituting the tuning parameter satisfying the condition (2×flight size)−size of receive window+1<N<3, if it is assumed that the duplicate acknowledgement threshold is calculated one operation prior to receiving the first duplicate acknowledgement message, as indicated in FIG. 7. Again, as outlined before, if the duplicate acknowledgement threshold is calculated one operation later, i.e., upon receiving the first duplicate acknowledgement message, N<3 is to be replaced by N<5. Advantageously, the tuning parameter N can, in this case, be set to 5, thus fulfilling the above discussed condition that an acknowledgement for the retransmitted data segment is received before the number of previously unsent data segments, i.e. data segments which are sent for the first time, exceeds the size of the receive window. If the condition were not fulfilled, this would lead to a transmission stall at the sending peer, as the sending peer is only allowed to transmit a further data segment in the sequence, if the number of sent but unacknowledged data segments does not exceed the size of the receive window as advertised by the receiving peer.

Using the above formulas, it is possible that a negative duplicate acknowledgement threshold is obtained, in cases were the flight size is large in relation to the receive window. In order to avoid such a negative duplicate acknowledgement threshold, a max-operator can be used, which can prevent the duplicate acknowledgement threshold from obtaining such negative values. Accordingly, the preferred way of calculating the duplicate acknowledgement threshold at the time indicated in FIG. 7, i.e., prior to receiving the first duplicate acknowledgement message, is duplicate acknowledgement message threshold=max (size of receive window−2×flight size+N,1).

In the following examples are described, how the tuning parameter N can be determined. As noted above, with N=3 and determining the duplicate acknowledgement message threshold one operation prior to receiving the first duplicate acknowledgement message, the acknowledgement for the retransmission of the first data packet 01 is exactly received after the receive window is "filled up". This is, however, valid only under the condition that only one packet was lost and that no packet reordering occurred. In cases where the two conditions are valid, any increase of N beyond 3 would eventually lead to a window stalling, i.e., the sending peer would not be allowed to transmit any further data packets. Therefore, N=3 is considered the upper bound for N. However, it is noted that in cases where more than one segment has been lost, it is possible to increase N further, and still to avoid window stalling. This however, should not be the typical case, and N=3 may preferably be selected as upper bound.

Regarding the lower bound for N it is a reasonable requirement that any algorithm for calculating the duplicate acknowledgement threshold should calculate a value larger or equal to 1. This is the value obtained if N=(2×flight size−receive window−1).

Generally, if N is decreased, the system is made less conservative, i.e., error recovery is triggered earlier, in other words it is earlier judged that a data packet is lost. However, with a decreased N and thus duplicate acknowledgement threshold, the sending peer is less robust to a packet reordering the network.

As a reasonable value between the upper bound and lower bound leading to good results, the duplicate acknowledgement message threshold may be set to max(size of receive window−2×flight size,1)

i.e. N=0.

The communication device of FIG. 6 may be configured to perform the above calculations and operations.

More precisely, in another embodiment, the communication device comprises means for setting the duplicate acknowledgement threshold such that the data segment determined to be lost is retransmitted before a point in time in the sequence of data segments selected such that the acknowledgement message indicating proper receipt of the data segment determined to be lost, i.e. the retransmitted data segment, is expected to be received at the sending peer before transmitting the data segment with a sequence number exceeding the sequence number of the data segment determined to be lost by the size of the receive window.

Further, in another embodiment, the communication device comprises means for determining the duplicate acknowledgement threshold on the basis of a size of a usable window constituted by the difference between the size of the receive window and a flight size, the flight size representing the number of transmitted data segments which have not yet been acknowledged.

Further, in another embodiment, the communication device comprises means for determining the duplicate acknowledgement threshold based on the difference between the size of the usable window and the flight size.

The means for determining the duplicate acknowledgement may be adapted perform the determination one instant in time prior to receiving the first duplication message as the larger value of:
the value 1 and the value obtained by calculating (size of receive window−(k×flight size)), wherein k is a float.

The means for determining the duplicate acknowledgement may be adapted to use k=2.

Further, in another embodiment, the communication device comprises means for determining the duplicate acknowledgement threshold as size of receive window−(2×flight size)+N, with N constituting a tuning parameter satisfying the condition (2×flight size)−size of receive window+1<N<3.

Further, in another embodiment, the communication device comprises means for updating the duplicate acknowledgement threshold upon determining a change in the size of the receive window.

Further, in another embodiment, the communication device comprises means for updating the duplicate acknowledgement threshold at least each first time that a duplicate acknowledgement message for one of the data segments is received.

Further, in another embodiment, the communication device comprises means for updating the duplicate acknowledgement threshold each time that an acknowledgement message is received.

In addition to the above outlined setting of the duplicate acknowledgement message threshold based on the size of a receive window, with the size of the receive window representing a number of data segments which can be stored in a buffer space at the receiving peer, the situation at the sending peer may be taken into account as well. More precisely, according to another embodiment, the data segment determined to be lost is retransmitted, if the sending peer is blocked from transmitting a previously unsent data segment. In this case, the sending peer may be considered blocked, if one of the following conditions is fulfilled: the number of previously unsent data segments exceeds the size of the receive window; the number of previously unsent data segments exceeds the size of the send window; or an application constituting the source of the data segments does not supply data segments for transmission. The method can be put to practice in any suitable or appropriate way, and can especially be present in the form of a computer program, and consequently also in the form of a storage medium carrying such a computer program. Equally, the technology described herein can be present in the form of a communication device arranged to operate in accordance with the method.

Although the technology described herein has been described by way of detailed embodiments, the claims are not restricted to these embodiments.

The invention claimed is:

1. A method of controlling the flow of a sequence of data segments from a sending peer to a receiving peer, comprising:
transmitting data segments from the sending peer to the receiving peer in the order of the sequence;
receiving acknowledgment messages from the receiving peer, where an acknowledgment message indicates the correct receipt of a data segment in the proper order of the sequence;
receiving a duplicate acknowledgement message from the receiving peer at the sending peer, indicating that a data segment was received, but not in the proper order of the sequence, the duplicate acknowledgement message being for the last correctly received data segment in the order of the sequence of data segments;
deciding that a data segment, which was sent but not acknowledged, was lost if the number of duplicate acknowledgement messages reaches a duplicate acknowledgement threshold determined based on the size of a receive window, the size of the receive window corresponding to a number of data segments which can be stored at one time in a buffer space at the receiving peer; and
retransmitting the data segment decided to be lost.

2. Method according to claim 1, wherein the duplicate acknowledgement threshold is set such that the data segment determined to be lost is retransmitted before a point in time in the sequence of data segments selected such that the acknowledgement message indicating proper receipt of the data segment determined to be lost is expected to be received at the sending peer before transmitting the data segment with a sequence number exceeding the sequence number of the data segment determined to be lost by the size of the receive window.

3. Method of claim 1, wherein the duplicate acknowledgement threshold is determined on the basis of a size of a usable window constituted by the difference between the size of the receive window and a flight size, the flight size representing the number of transmitted data segments which have not yet been acknowledged.

4. Method of claim 1, wherein the duplicate acknowledgement threshold is determined based on the difference between the size of the usable window and the flight size.

5. Method of claim 1, wherein the duplicate acknowledgement threshold is determined one instant in time prior to receiving the first duplication message as the larger value of:
the value 1 and the value obtained by calculating (size of receive window−(k×flight size)),
wherein k is a float.

6. Method of claim 5, wherein k=2.

7. Method of claim 1, wherein the duplicate acknowledgement threshold is determined as size of receive window−(2×flight size)+N, with N constituting a tuning parameter satisfying the condition (2×flight size)−size of receive window+1<N<3.

8. Method of claim 1, wherein the duplicate acknowledgement threshold is updated upon determining a change in the size of the receive window.

9. The method of claim 1, wherein the duplicate acknowledgement threshold is updated at least each first time that a duplicate acknowledgement message for one of the data segments is received.

10. The method of claim 7, wherein N=5.

11. The method of claim 1, wherein the duplicate acknowledgement threshold is updated each time that an acknowledgement message is received.

12. The method of claim 1, wherein the data segment determined to be lost is retransmitted, if the sending peer is blocked from transmitting a previously unsent data segment.

13. The method of claim 12, wherein the sending peer is considered blocked, if one of the following conditions is fulfilled:
the number of previously unsent data segments exceeds the size of the receive window;
the number of previously unsent data segments exceeds the size of the send window;
an application constituting the source of the data segments does not supply data segments for transmission.

14. A computer readable memory device that stores a computer program arranged to perform the method of claim 1 when executed on a computer.

15. A communication device controlling the flow of a sequence of data segments from a sending peer to a receiving peer, comprising:
means for transmitting data segments from the sending peer to the receiving peer in the order of the sequence,
means for receiving acknowledgment messages from the receiving peer, where an acknowledgment message indicates the correct receipt of a data segment in the proper order of the sequence,
means for receiving a duplicate acknowledgement message from the receiving peer at the sending peer, wherein the duplicate acknowledgement message indicates that a data segment was received but not in the proper order of the sequence, the duplicate acknowledgement message being for the last correctly received packet in the order of the sequence of data segments,
means for deciding that a data segment, which was sent but not acknowledged, was lost if the number of duplicate acknowledgement messages reaches a duplicate acknowledgement threshold determined based on the size of a receive window, the size of the receive window corresponding to a number of data segments which can be stored in a buffer space at the receiving peer; and
means for retransmitting the data segment determined to be lost.

16. A communication device controlling the flow of a sequence of data segments from a sending peer to a receiving peer, comprising:
a transmitter configured to transmit data segments from the sending peer to the receiving peer in the order of the sequence;
a receiver configured to receive acknowledgment messages from the receiving peer, where an acknowledgment message indicates the correct receipt of a data segment in the proper order of the sequence;
the receiver being further configured to receive a duplicate acknowledgement message from the receiving peer at the sending peer;
wherein the duplicate acknowledgement message indicates that a data segment was received but not in the proper order of the sequence, the duplicate acknowledgement message being for the last correctly received packet in the order of the sequence of data segments; and
electronic circuitry configured to decide that a data segment, which was sent but not acknowledged, was lost if the number of duplicate acknowledgement messages reaches a duplicate acknowledgement threshold determined based on the size of a receive window, the size of the receive window corresponding to a number of data segments which can be stored in a buffer space at the receiving peer,
wherein the transmitter is further configured to retransmit the data segment determined to be lost.

17. The communication device according to claim 16, wherein the electronic circuitry is configured to set the duplicate acknowledgement threshold such that the data segment determined to be lost is retransmitted before a point in time in the sequence of data segments selected such that the acknowledgement message indicating proper receipt of the data segment determined to be lost is expected to be received at the sending peer before transmitting the data segment with a sequence number exceeding the sequence number of the data segment determined to be lost by the size of the receive window.

18. The communication device of claim 16, wherein the electronic circuitry is configured to determine the duplicate acknowledgement threshold on the basis of a size of a usable window constituted by the difference between the size of the receive window and a flight size, the flight size representing the number of transmitted data segments which have not yet been acknowledged.

19. The communication device of claim 16, wherein the electronic circuitry is configured to determine the duplicate acknowledgement threshold based on the difference between the size of the usable window and the flight size.

20. The communication device of claim 16, wherein the electronic circuitry is configured to determine the duplicate acknowledgement threshold one instant in time prior to receiving the first duplication message as the larger value of:
the value 1 and the value obtained by calculating (size of receive window−(k×flight size)),
wherein k is a float.

21. The communication device of claim 20, wherein k=2.

22. The communication device of claim 16, wherein the electronic circuitry is configured to determine the duplicate acknowledgement threshold as size of receive window−(2×flight size)+N, with N constituting a tuning parameter satisfying the condition (2×flight size)−size of receive window+1≤N≤3.

23. The communication device of claim 16, wherein the electronic circuitry is configured to update the duplicate acknowledgement threshold upon determining a change in the size of the receive window.

24. The communication device of claim 16, wherein the electronic circuitry is configured to update the duplicate acknowledgement threshold at least each first time that a duplicate acknowledgement message for one of the data segments is received.

25. The communication device of claim 24, wherein N=5.

26. The communication device of claim 16, wherein the electronic circuitry is configured to update the duplicate acknowledgement threshold is updated each time that an acknowledgement message is received.

27. The communication device of claim 16, wherein the electronic circuitry is configured to have the data segment determined to be lost retransmitted if the sending peer is blocked from transmitting a previously unsent data segment.

28. The communication device of claim 27, wherein the sending peer is considered blocked, if one of the following conditions is fulfilled:
the number of previously unsent data segments exceeds the size of the receive window;
the number of previously unsent data segments exceeds the size of the send window;
an application constituting the source of the data segments does not supply data segments for transmission.

* * * * *